(12) United States Patent
Ritter

(10) Patent No.: US 6,947,055 B2
(45) Date of Patent: *Sep. 20, 2005

(54) SYSTEM AND METHOD FOR SYNTHESIS OF PARAMETRIC TEXTURE MAP TEXTURES

(75) Inventor: Bradford A. Ritter, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 10/683,196

(22) Filed: Oct. 10, 2003

(65) Prior Publication Data

US 2004/0075666 A1 Apr. 22, 2004

Related U.S. Application Data

(63) Continuation of application No. 09/921,476, filed on Aug. 3, 2001, now Pat. No. 6,700,585.

(51) Int. Cl.$^7$ .................................................. G09G 5/00
(52) U.S. Cl. ...................................................... 345/588
(58) Field of Search ................................. 345/581, 582, 345/584, 586, 585, 583, 588; 382/218

(56) References Cited

U.S. PATENT DOCUMENTS

| | | | |
|---|---|---|---|
| 5,561,756 A | 10/1996 | Miller et al. | |
| 5,872,867 A | 2/1999 | Bergen | |
| 6,018,349 A | 1/2000 | Szeliski et al. | |
| 6,028,677 A * | 2/2000 | Keithley | 358/1.9 |
| 6,424,351 B1 * | 7/2002 | Bishop et al. | 345/582 |
| 6,515,674 B1 | 2/2003 | Gelb et al. | |
| 6,556,210 B1 | 4/2003 | Yamamoto et al. | |
| 6,583,790 B1 | 6/2003 | Wolters | |
| 6,593,933 B1 | 7/2003 | Xu et al. | |
| 6,762,769 B2 * | 7/2004 | Guo et al. | 345/582 |
| 2002/0024516 A1 | 2/2002 | Chen et al. | |
| 2002/0122043 A1 | 9/2002 | Freeman et al. | |
| 2002/0131641 A1 | 9/2002 | Luo et al. | |
| 2003/0026588 A1 | 2/2003 | Elder et al. | |

OTHER PUBLICATIONS

Gersho, Allen et al., "Vector Quantization and Signal Compression", Kluw er Academic Publishers Group, 1992, pp. 2 cover pages, vii–ix & 309–459.

Burt, Peter J. et al., "A Multiresolution Spline With Application to Image Mosaics", ACM Transactions on Graphics, vol. 2, No. 4, Oct. 1983, pp. 217–236.

Popat, Kris et al., "Cluster–Based Probability Model and Its Application to Image and Texture Processing", IEEE Transactions on image processing, vol. 6, No. 2, Feb. 1997, pp. 268–284.

U.S. Appl. No. 09/921,477, A. Christen.
U.S. Appl. No. 09/921,464, B. Ritter.
Wei, Li–Yi et al., "Fast Texture Synthesis using Tree–Structured Vector Quantization", Stanford University, 10 pages.

* cited by examiner

Primary Examiner—Ryan Yang

(57) ABSTRACT

In one embodiment, the present invention is directed to method for assigning coefficients to a texel of a parametric texture map (PTM) texture. The method may comprise the steps of: generating a random PTM matrix of a desired size, the random PTM matrix comprising texels possessing random valued coefficients; selecting a texel from the random PTM matrix; determining a first neighborhood of the texel from the random PTM matrix; comparing the first neighborhood to neighborhoods of a sample PTM texture to determine an optimal texel of the sample PTM texture; and assigning PTM coefficients of the optimal texel to the texel from the random PTM matrix.

20 Claims, 2 Drawing Sheets

```
                    300              310a  310b
                     \                 /    /
        FUNCTION SYNTHESIZE_TEXTURE (SAMPLE_TEXTURE, OUTPUTSIZE) {
        301~ NEW_TEXTURE ←— INITIALIZE (OUTPUTSIZE);
        302~ G_a ←— BUILD PYRAMID (SAMPLE_TEXTURE);
        303~ G_s ←— BUILD PYRAMID (NEW_TEXTURE);
        304~ FOR EACH LEVEL Lev FROM LOWER TO HIGHER RESOLUTIONS OF G_s
                LOOP THROUGH ALL LEVELS (X_s, Y_s) OF G_s (Lev) {
                    305~ C ←— FIND BEST MATCH (G_a, G_s, Lev, X_s, Y_s);
                    306~ G_s (Lev, X_s, Y_s) ←— C; }
        307~ NEW_TEXTURE ←— RECON PYRAMID (G_s);
        308~ RETURN NEW_TEXTURE;
            }
```

```
                    300                        310a    310b
FUNCTION SYNTHESIZE_TEXTURE (SAMPLE_TEXTURE, OUTPUTSIZE) {
301 — NEW_TEXTURE ← INITIALIZE (OUTPUTSIZE);
302 — $G_a$ ← BUILD PYRAMID (SAMPLE_TEXTURE);
303 — $G_s$ ← BUILD PYRAMID (NEW_TEXTURE);
304 — FOR EACH LEVEL Lev FROM LOWER TO HIGHER RESOLUTIONS OF $G_s$
        LOOP THROUGH ALL LEVELS $(X_s, Y_s)$ OF $G_s$ (Lev) {
    305 — C ← FIND BEST MATCH $(G_a, G_s, Lev, X_s, Y_s)$;
    306 — $G_s$ (Lev, $X_s, Y_s$) ← C; }
307 — NEW_TEXTURE ← RECON PYRAMID $(G_s)$;
308 — RETURN NEW_TEXTURE;
}
```

FIG. 3

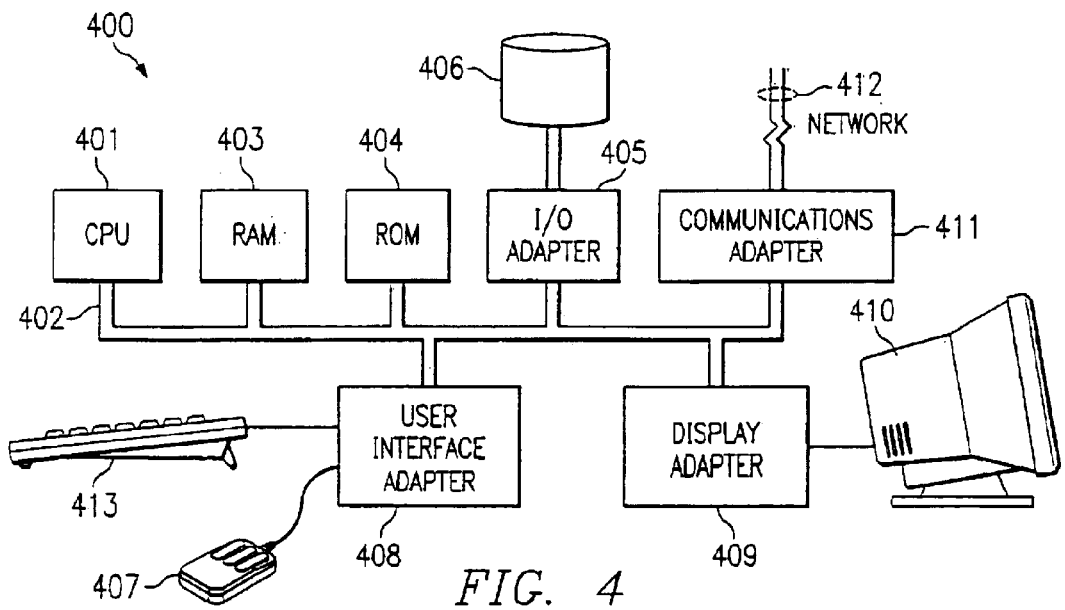

FIG. 4

SYSTEM AND METHOD FOR SYNTHESIS OF PARAMETRIC TEXTURE MAP TEXTURES

CROSS-REFERENCE TO RELATED APPLICATIONS

The present invention is a continuation of U.S. Pat. Ser. No. 09/921,476, filed Aug. 3, 2001, now U.S. Pat. No. 6,700,585 entitled "SYSTEM AND METHOD FOR SYNTHESIS OF PARAMETRIC TEXTURE MAP TEXTURES," which is incorporated herein by reference; also, the present application is related to co-pending and commonly assigned U.S. patent application Ser. No. 09/528,700, filed Mar. 17, 2000 (issued as U.S. Pat. No. 6,583,790), entitled "APPARATUS FOR AND METHOD OF RENDERING 3D OBJECTS WITH PARAMETRIC TEXTURE MAPS," co-pending and commonly assigned U.S. patent application Ser. No. 09/921,477, filed Aug. 03, 2001, entitled "SYSTEM AND METHOD FOR RENDERING A TEXTURE MAP UTILIZING AN ILLUMINATION MODULATION VALUE," and co-pending and commonly assigned U.S. patent application Ser. No. 09/921,464, filed Aug. 3, 2001, entitled "SYSTEM AND METHOD FOR PERFORMING TEXTURE SYNTHESIS," which are incorporated herein by reference.

BACKGROUND OF THE INVENTION

1. Technical Field

The present invention is related to computer graphics and more particularly to a system and method for synthesis of parametric texture map (PTM) textures.

2. Background

Various techniques have been utilized to render graphical images via computer systems. One representation of visual images is referred to as a texture. A texture refers to a graphics data structure which models the surface appearance of an object. A texture may represent the visual experience of many materials and substances (e.g., terrain, plants, minerals, fur, and skin). Textures may be created digitally by sampling a physical surface utilizing photographic techniques. Alternatively, textures may be created manually utilizing a suitable graphics design application.

Texture synthesis refers to creating a new texture of a selected size from a sample texture of a fixed size. For example, FIG. 1A depicts exemplary texture 101. Texture 101 includes a distribution of diamonds and stars. Although the diamonds and stars appear to be distributed in a semblance of order, a degree of randomization is apparent. The diamonds and stars seem to be arranged according to a stochastic process. FIG. 1B depicts exemplary synthesized texture 102. Synthesized texture 102 is not merely an enlarged or upscaled version of texture 101. Synthesized texture 102 possesses approximately the same degree of detail per unit of area as texture 101. The distribution of diamonds and stars in synthesized texture 102 does not exactly correspond to the distribution in texture 101. However, it appears that the same stochastic process has generated the distribution of synthesized texture 102.

Synthesizing a new texture that appears to a observer to have been generated from the same stochastic process may be quite challenging. In particular, interpolation techniques (such, as Fourier coefficient algorithms) are not helpful, because the level of visual detail as a function of area is not maintained in the larger synthesized texture. Moreover, boundary conditions present a number of difficulties. In particular, seams and repetitions may be visually evident thereby reducing the realism of the synthesized texture.

A texture synthesis algorithm has been developed by Li-Yi Wei and Marc Levoy which addresses the preceding texture synthesis issues. The algorithm is described in *Fast Texture Synthesis Using Tree-Structured Vector Quantization*, Li-Yi Wei and Marc Levoy, SIGGRAPH 2000 Conference Proceedings, pg. 479–488, which is incorporated herein by reference. The algorithm begins by utilizing a texture of a given size to generate a texture of some arbitrary larger size. Wei and Levoy describe (a) modeling or estimating the stochastic process associated with the original texture and (b) sampling from the original texture to synthesize or produce the new texture having the larger size. At a high level, the algorithm synthesizes the new texture by modeling the original texture using Markov Random Field concepts. The algorithm assembles the new texture in a pixel by pixel manner. Each pixel of the new matrix is determined by comparing its "neighborhood" to all neighborhoods in the original matrix.

Specifically, the synthesis algorithm taught by Wei and Levoy begins by receiving a data structure defining a texture. The data structure is a matrix of red, green, and blue (RGB) values defining the texture, where RGB is a well-known encoding method for representing the red, green, and blue chromatic channels of a pixel. A second matrix,is created that is equal in size to the desired size of the texture to be synthesized. The second matrix is initialized with white random noise.

The algorithm proceeds by examining each pixel of the second matrix in raster scan order (e.g., from left to right and top to bottom). The algorithm transforms each pixel by first determining the neighborhood of each pixel. The neighborhood refers to a group of pixels that are relatively adjacent to the respective pixel of the second matrix. Also, the neighborhood is preferably chosen to be causal. Specifically, it is selected so that it only contains pixels that have already been synthesized and not pixels containing noise values. For example, FIG. 1C depicts exemplary matrix 103. Matrix 103 comprises pixel 104 and exemplary neighborhood 105. Neighborhood 105 only contains pixels that are previous to pixel 104 in the raster scan order. It shall be appreciated that this is not always possible. Accordingly, the first few pixels are allowed to contain neighborhoods with noise values. However, after a number of pixels have been synthesized, it is preferred to only utilize causal neighborhoods. Also, when a pixel is selected that is close to an edge of the matrix, the neighborhood may be selected in a toroidal manner, i.e., the neighborhood wraps around to the other side of the matrix.

The value of each respective pixel is assigned by comparing it to each pixel in the original matrix. Specifically, each pixel of the second matrix is assigned the color of the pixel in the original matrix that possesses a neighborhood that most closely matches the respective neighborhood of the pixel to be synthesized. The determination of most-closely matching neighborhoods is performed by utilizing a simple norm (sum of square differences) calculation. For example, $R_1$, $G_1$, $B_1$ may represent the red, green, and blue components or channels of a pixel in a neighborhood of the original or sample texture. $R_2$, $G_2$, $B_2$ may represent the red, green, and blue components or channels of a corresponding pixel in a neighborhood of the texture to be synthesized. The square of the difference equals $(R_1-R_2)^2+(G_1-G_2)^2+(B_1-B_2)^2$. The sum of the differences then equals the summation of the previous calculation for each pixel pair between the two neighborhoods. The lowest norm corresponds to the most closely matching neighborhood.

Wei and Levoy also describe optimizations to the algorithm. First, multiresolution synthesis is described to adapt to larger sized neighborhoods. The multi-resolution synthesis operates by building Gaussian pyramids from the original matrix and the noise matrix. A Gaussian pyramid is a hierarchy of low-pass filtered versions of the original image, such that successive levels correspond to lower frequencies.

The Gaussian pyramid is produced by low-pass filtering via convolution with a Gaussian filter kernel. Although Gaussian pyramids are described, other pyramid or multi-resolution data structures may be utilized in lieu thereof. The algorithm proceeds by transforming the noise Gaussian pyramid from lower to higher resolutions. The only modification for the multi-resolution case is that each neighborhood contains pixels in the current resolution and all lower resolutions.

Wei and Levoy further describe acceleration of the algorithm utilizing tree-structured vector quantization (TSVQ). As described in *Vector Quantization and Signal Compression*, A. Gersho and R. M. Gray (1992), which is incorporated herein by reference, TSVQ is a well-known technique for data compression. The tree generated by TSVQ may be used as a data structure for efficient nearest-point queries. To find the nearest point of a given query vector, the tree is traversed from the root in a best-first ordering by comparing the query vector with the two children codewords and then following the one that has a closer codeword. This process is repeated for each visited node until a leaf node is reached. The best codeword is then returned as the codeword of that leaf node. Unlike full searching, the result codeword may not be the best or closest one, since only part of the tree is traversed. However, the result codeword usually approximates the exact solution, and the computation is more efficient than full searching.

To use TSVQ in the synthesis algorithm, the set of neighborhood pixels are collected for each input pixel and treated as a vector of a size equal to the number of pixels in the neighborhood. The vectors for each neighborhood are used as the training data to generate the corresponding tree structure codewords. During the synthesis process, the (approximate) closest point neighborhood is found by performing a best-first traversal of the binary-tree structure.

By utilizing the preceding techniques described by Wei and Levoy, texture synthesis may be performed with relatively appreciable quality. Specifically, textures of significant size may be produced from relatively small sample textures. Moreover, the subjective visual quality of the synthesized textures remains comparable to the original samples.

However, the algorithm described by Wei and Levoy contains certain limitations. Specifically, the data structure (RGB matrix) utilized to represent the texture is relatively simple. It does not facilitate modeling of relatively complex visual effects. For example, the RGB representation does not facilitate appreciable perception of surface deformations. Also, the RGB representation does not account for self-shadowing or interreflections. Optical effects such as anisotropic and Frensel shading models are not supported by the RGB representation.

BRIEF SUMMARY OF THE INVENTION

In one embodiment, the present invention is directed to method for assigning coefficients to a texel of a paranetric texture map (PTM) texture. The method may comprise the steps of: generating a random PTM matrix of a desired size, the random PTM matrix comprising texels possessing random valued coefficients; selecting a texel from the random PTM matrix; determining a first neighborhood of the texel from the random PTM matrix; comparing the first neighborhood to neighborhoods of a sample PTM texture to determine an optimal texel of the sample PTM texture; and assigning PTM coefficients of the optimal texel to the texel from the random PTM matrix.

BRIEF DESCRIPTION OF THE DRAWINGS

FIG. 3 depicts exemplary pseudo-code according to embodiments of the present invention.

FIG. 4 depicts an exemplary computer system on which embodiments of the present invention may be implemented.

DETAILED DESCRIPTION OF THE INVENTION

The present invention is related to a system and method for synthesizing a parametric texture mapping (PTM) texture. PTM is a computer algorithm for rendering objects using a two-dimensional representation of light. PTM is desirable because it produces quite realistic images based on material properties while employing reasonable computational complexity. Additionally, it shall be appreciated that the PTM algorithm is capable of producing appreciably greater realism for graphical images than many graphical rendering techniques.

In PTM, a texture may be represented as a matrix of discrete components called "texels." Texels may be understood as being analogous to pixels. However, texels are not defined to equal a static value or color. Instead, texels are more complex data structures which contain lighting information. The lighting information is used to reconstruct the surface color under varying light conditions. By encoding lighting information in this manner, PTM textures permit perception of surface deformations. Additionally, PTM textures permit perception of self-shadowing and interreflections. PTM textures may also simulate other optical effects such as anisotropic and Frensel shading models.

In PTM, each texel is defined by a biquadric function with six coefficients. Each of the texels is represented by the following form:

$$PTM(u;v) = Au^2 + Bv^2 + Cuv + Du + Ev + F,$$

where u and v represent scalar quantities associated with orthogonal components of a vector in a plane. For example, u and v may represent the intensity of light from two different directions where the texel is rendered on a three-dimensional object or model. Specifically, a light source is first determined to be illuminating the texture which, for example, may be wrapped on the three-dimensional object. The light source is defined as being positioned at a location relative to the texel being illuminated in the direction defined by illumination vector, $\vec{L}$. Illumination vector, $\vec{L}$, is typically a unit vector. Secondly, surface normal vector, $\vec{S}$, is determined (which is also typically a unit vector). The projection of illumination vector, $\vec{L}$, onto the plane defined by surface normal vector, $\vec{S}$, is determined. The projection may be represented as two orthogonal vector components on the plane defined by surface normal vector, $\vec{S}$. The two orthogonal vector components are respectively associated with the scalar values, u and v.

Figure 1A:
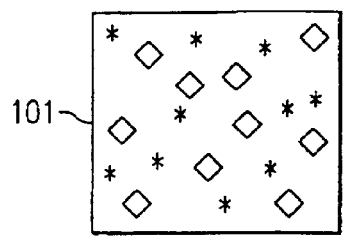
FIG. 1A depicts an exemplary texture according to the prior art.
Figure 1B:
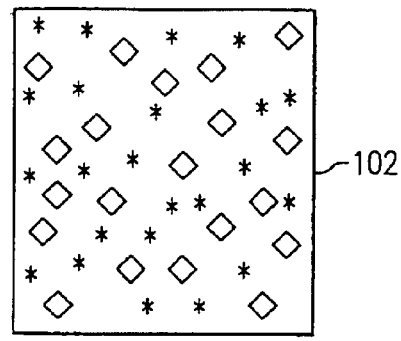
FIG. 1B depicts an exemplary texture synthesized from the texture depicted in FIG. 1A according to the prior art.
Figure 1C:
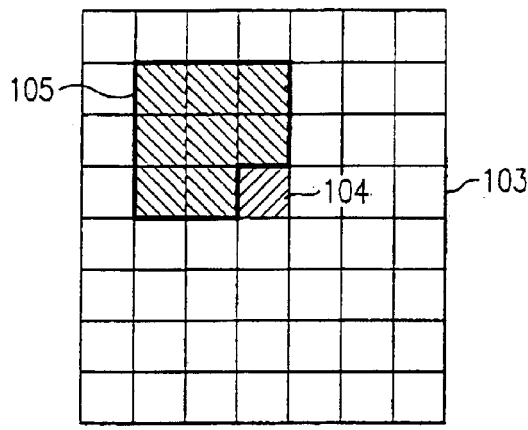
FIG. 1C depicts an exemplary matrix with a selected pixel and a causal neighborhood according to the prior art.
Figure 2:
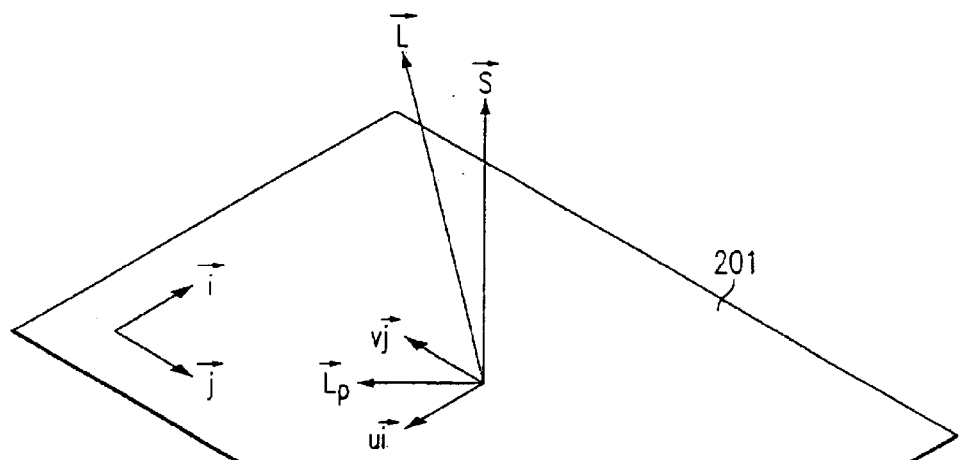
FIG. 2 depicts an exemplary plane, surface normal vector, and illumination vector according to embodiments of the present invention.

To aid the reader's understanding of the vector concepts, reference is now made to FIG. 2 which depicts exemplary plane 201 associated with a texel, surface normal vector, $\vec{S}$, and illumination vector, $\vec{L}$. As is well-known in the art, plane 201 is defined by a position and surface normal vector, $\vec{S}$. The unit vectors $\vec{i}$ and $\vec{j}$ are mutually orthogonal on plane 201. Unit vectors $\vec{i}$ and $\vec{j}$ are also orthogonal to surface normal vector, $\vec{S}$, by definition. $\vec{L}_p$ is the projection of illumination vector, $\vec{L}$, onto plane 201. $\vec{L}_p$ is composed of components ($u\vec{i}$, $v\vec{j}$), where u and v are the scalar values of $\vec{L}_p$ in the $\vec{i}$ and $\vec{j}$ directions, respectively.

The coefficients of the texel representation equation, A–F, of the PTM texture function described above may be determined by repeatedly sampling a surface. For example, a physical stone surface may be digitally photographed a number of times utilizing different illumination angles. The coefficients, A–F, may then be determined from the digital information utilizing a least square approximation. Singular value decomposition (SVD) may be utilized to perform this analysis. Further details regarding implementation of PTM algorithms are disclosed in U.S. patent application Ser. No. 09/528,700, entitled "APPARATUS FOR AND METHOD OF RENDERING 3D OBJECTS WITH PARAMETRIC TEXTURE MAPS."

In some embodiments of the present invention, the PTM function defines the brightness of a texel and the chromaticity is held constant, i.e., a single PTM function is utilized for all of the red, green, and blue (RGB) chromatic components or channels. However, it shall be appreciated that separate functions may be defined for red, green, and blue (RGB) chromatic components or channels. The separate functions may be used to calculate gray-level intensities of the RGB channels. According to this approach, three separate functions are each evaluated according to u and v as determined by the same surface normal vector, $\vec{S}$, and the same illumination vector, $\vec{L}$. However, it is advantageous to cause the chromaticity to remain independent of u and v, because this approach reduces the computational complexity of the algorithm.

PTM textures may be utilized for any number of applications. PTM textures may be utilized to render three-dimensional objects on two-dimensional computer screens with a relatively high degree of realism. For example, a stucco PTM texture may be created. The stucco PTM texture may be wrapped onto a three-dimensional object representing a house by an architectural software application. Various lighting conditions may be applied to the house so that a consumer may decide whether to pursue home renovations. Further details regarding the use of PTM textures in connection with three-dimensional mapping techniques are disclosed in U.S. patent application Ser. No. 09/921,477, entitled "SYSTEM AND METHOD FOR RENDERING A TEXTURE MAP UTILIZING AN ILLUMINATION MODULATION VALUE."

Although PTM textures were primarily developed for three-dimensional texture mapping applications, PTM textures are not limited to three-dimensional applications. For example, PTM textures may be utilized to perform image enhancement. PTM textures may also be utilized to interactively control lighting conditions to promote increased perception of surface characteristics.

It shall be appreciated that PTM provides appreciable advantages over other graphics rendering techniques. In particular, PTM textures provide the capability of representing a broad; range of optical effects. PTM textures allow perception of self-shadowing and interreflections. PTM textures allow construction of images utilizing ansiotropic and Frensel shading models, Moreover, PTM textures may be readily constructed from real world samples (e:g., photographs). Additionally, it shall be appreciated that the superior realism of PTM textures is achieved with, reasonable computational requirements.

It is desirable to synthesize PTM textures of arbitrary sizes from relatively small sample textures. For example, video processing cards utilized on personal computers may perform graphical operations with PTM textures. However, the local memory of the video processing cards are typically limited. Accordingly, scaling PTM textures to desired sizes allows video processing cards to store a greater number of small PTM sample textures. By storing greater numbers of PTM sample textures, video processing cards are capable of producing greater numbers of imaging effects.

However, it shall be appreciated that the representation of the visual information in a PTM texture is significantly different from the representation of visual information in the textures described in the Wei and Levoy article discussed above. Specifically, the textures synthesized in the Wei and Levoy article do not vary as a function of incident light direction. Their comparison of neighborhoods relies on a simple representation of visual information. Accordingly, it is not possible to simply provide a PTM texture as the input texture in the Wei and Levoy synthesis algorithm to generate a synthesized PTM texture.

Accordingly, the present invention provides an algorithm to synthesize PTM textures. Embodiments of the present invention are similar to the Wei and Levoy algorithm in that a neighborhood comparison approach is utilized. However, embodiments of the present invention differ from the Wei and Levoy algorithm in several pertinent respects due to the unique characteristics of PTM textures.

First, embodiments of the present invention utilize a (u,v) pair metric to ascertain how well a neighborhood in a PTM texture matches a neighborhood in another PTM texture. The metric evaluation begins by selecting a neighborhood of the texel to be synthesized. The neighborhood may be advantageously selected utilizing a predetermined shape and size. In general, the neighborhood size may be assigned by accepting an input parameter from a user from, for example, a command line utility, a graphical user interface (GUI), or the like. As noted by Wei and Levoy, the neighborhood size should approximate the scale of the largest regular texture structure in the sample texture. The neighborhood may advantageously be selected to be causal. Also, the neighborhood may be selected in a toriodal manner. The next step is selecting a neighborhood in the sample texture.

Also, in embodiments of the present invention, three (u,v) pairs are selected. Each (u,v) pair may be advantageously selected such that the quantity $(u^2+v^2)^{1/2}$ approximately equals 0.9. Additionally, the (u,v) pairs may be advantageously selected to maximize the separation between the pairs. For example, the following (u,v) pairs may be utilized: (0.9, 0), (−0.45, 0.779423) and (−0.45, −779423). By selecting the (u,v) pairs in this manner, greatering image contrast will exhibited from region to region. In general, the greater image contrast produces improved synthesis quality. Although in some cases, the quantity $(u^2+v^2)^{1/2}$ may be selectively decreased if texture synthesis at greater values does not produce desired results. Additionally, it shall be appreciated that the present invention is not limited to any particular selection of (u,v) pairs.

Each texel of the neighborhood associated with the texel to be synthesized is evaluated for each (u,v) pair using the PTM function. For convenience of notation, the PTM function value for the $i^{th}$ (u,v) pair and for the $j^{th}$ texel of the neighborhood associated with the texel to be synthesized may be designated as $PTM_s$ (i, j). Like wise, each texel of the neighborhood associated with sample texture is evaluated for each (u,v) pair using the PTM function. The PTM function value for the $i^{th}$ (u,v) pair and for the $j^{th}$ texel of the neighborhood associated with original (or sample) texture may be designated as $PTM_o$ (i, j) The metric is evaluated using a norm (sum of the square differences) calculation via the values associated with the (u,v) pairs. The metric may be compactly described as:

$$\Sigma\Sigma(PTM_o(i,j)-PTM_s(i,j))^2,$$

where the summation occurs over all values of i and j. If multiple color channels are utilized, the summation may also occur over each color channel. The metric measures the closeness or similarity of the two neighborhoods. A large metric value identifies neighborhood that are appreciably different, while a low metric value identifiers neighborhoods that are substantially similar. The neighborhood from the sample texture that is associated with the lowest metric value defines an optimal texel. The coefficients of the optimal texel are assigned to the texel being synthesized.

Even though the preceding discussion describes utilizing three (u,v) pairs, it shall be appreciated that the present invention is not limited to utilizing three (u,v) pairs. More or less (u,v) pairs may be utilized. How ever, it has been determined that three (u,v) pairs typically reflects the best compromise between accurately comparing neighborhoods of PTM texture maps and minimizing, computational complexity. Generally, it has been observed that evaluating the PTM function for additional (u,v) pairs does not provide appreciably greater synthesis quality.

FIG. 3 depicts exemplary pseudo-code 300 according to embodiments of the present invention. Pseudo-code 300 is a function that synthesizes a new texture having a desired size from a sample texture. Pseudo-code 300 receives Sample_Texture 310a and Outputsize 310b data structures as function parameters. Sample_Texture 310a and Outputsize 310b may be obtained via a command line utility, a graphical user interface (GUI), or the like. Sample_Texture 310a is a data structure which defines the sample PTM texture from which the new texture will be synthesized. Outputsize 310b specifies the desired size of the PTM texture to be synthesized by the function.

In line 301, pseudo-code 300 initializes the data structure (New_Texture) according to Outputsize 310b. New_Texture is initially filled with random PTM values. The PTM values may be assigned according to a white probability distribution function. However, according to certain embodiments of the present invention, the initialization step does not assign PTM coefficients to the texels of New_Texture according to a white probability distribution function. Instead, the coefficients are randomly selected from the coefficients of Sample_Texture. For example and not by way of limitation, if Sample_Texture contains a total number of 16,384 texels, a random function with a uniform probability distribution may be utilized. The random function may range from 0 to 16,383. The random function is evaluated for each texel in New_Texture. For each texel in New_Texture, the texel is assigned the PTM coefficients of the texel of Sample_Texture associated with the random function value. In essence, New_Texture at the initialization stage is a random mix of texels from Sample_Texture. By utilizing such random mix of texels, the complexity of the algorithm is reduced, because a white distribution function is not utilized and the number of generated random values is reduced. However, the reduction in complexity does not constrain the underlying stochastic process associated with New_Texture during texture synthesis.

Other techniques may be utilized to initialize $New_{13}$ Texture. For example, $New_{13}$ Texture may also include certain constant or structured texel components as disclosed in U.S. patent application Ser. No. 09/921,464, entitled "SYSTEM AND METHOD FOR PERFORMING TEXTURE SYNTHESIS."

In line 302, Gaussian pyramid $G_a$ is built or generated from Sample_Texture to produce a multi-resolution data structure. As is well-known in the art, a Gaussian pyramid is a hierarchy of low-pass filtered versions of the original image, such that successive levels correspond to lower frequencies. The Gaussian pyramid is produced by low-pass filtering via convolution with a Gaussian filter kernel. In line 303, Gaussian pyramid $G_s$ is built from New_Texture. It shall be appreciated that the present invention is not limited to Gaussian pyramids. Other pyramids or multi-resolution data structures may be utilized in lieu thereof.

After building the multi-resolution data structures, $Ga$ and $G_s$, a loop is performed at line 304. The loop iterates for each level, Lev, of $G_s$ and for all texels $(x_s, y_s,)$ of each level, Lev, of $G_s$. Inside the loop, neighborhood comparison occurs via the function FindBestMatch in step 305. The function FindBestMatch returns the coefficients of the optimal texel determined by neighborhood comparison. The function FindBestMatch may exhaustively examine each neighborhood of $G_a$ at the respective level, Lev, utilizing the (u,v) pair metric discussed above. Alternatively, the function FindBestMatch may utilize a TSVQ search of a binary tree generated with the (u,v) pair metric discussed above. The coefficients returned by the function FindBestMatch are assigned to PTM data structure C. The final portion of code inside the loop (line 306) assigns the coefficients associated with PTM data structure C to the respective texel, $(x_s, y_s,)$, of the respective level, Lev, of $G_s$.

In line 307, New_Texture is assigned the texels reconstructed from Gaussian pyramid $G_s$. New_Texture is returned as the function argument in step 308. New_Texture is the synthesized version of Sample_Texture of the specified size. New_Texture may then be utilized for any number of applications as desired by the user.

When implemented via executable instructions, various elements of the present invention are in essence the code defining the operations of such various elements. The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

FIG. 4 illustrates an embodiment of computer system 400 adapted according to embodiments of the present invention. Central processing unit (CPU) 401 is coupled to system bus 402. CPU 401 may be any general purpose CPU. Suitable processors, without limitation, include any processor from the Itarum™ family of processors or an PA-8500 processor also available from Hewlett-Packard Company. However, the present invention is not restricted by the architecture of CPU 401 as long as CPU 401 supports the inventive operations as described herein. CPU 401 may execute the various logical instructions according to embodiments of the present invention. For example, CPU 401 may execute machine level instructions according to pseudo-code 300.

Computer system 400 also preferably includes random access memory (RAM) 403, which may be SRAM, DRAM, SDRAM, or the like. Computer system 400 may utilize RAM 403 to store the various data structures used in PTM texture synthesis, such as the sample texture and the noise texture. Computer system 400 preferably includes ROM 404 which may be PROM, EPROM, EEPROM, or the like. RAM 403 and ROM 404 hold user and system data and programs as is well-known in the art.

Computer system 400 also preferably comprises input/output (I/O) adapter 405, communications adapter 411, user interface adapter 408, and display adapter 409. In alternative embodiments, display adapter 409 may perform various logical steps associated with PTM texture synthesis. For example, display adapter 409 may comprise logical instructions or logic elements (e.g., logic gates) which implement the operations of pseudo-code 300.

I/O adapter 405 preferably connects to storage devices 406, such as one or more of hard drive, CD drive, floppy disk drive, tape drive, to computer system 400. The storage devices may be utilized when RAM 403 is insufficient for the memory requirements associated with synthesis of large PTM textures. Communications adapter 411 is preferably adapted to couple computer system 400 to network 412, which may be one or more of telephone network, local (LAN) and/or wide-area (WAN) network, Ethernet network, and/or Internet network. User interface adapter 408 couples user input devices, such as keyboard 413 and pointing device 407, to computer system 400. Display adapter 409 is driven by CPU 401 to control the display on display device 410.

It shall be appreciated that the present invention is not limited to the architecture of system 400. For example, any suitable processor-based device may be utilized including personal data assistants (PDAs), computer game consoles, and multi-processor servers. Moreover, embodiments of the present invention may be implemented on application specific integrated circuits (ASIC) or very large scale integrated (VLSI) circuits. In fact, persons of ordinary skill in the art may utilize any number of suitable structures capable of executing logical operations according to the embodiments of the present invention.

What is claimed is:

1. A method for assigning coefficients to a texel of a parametric texture map (PTM) texture, comprising:
    (a) generating a random PTM matrix of a desired size, said random PTM matrix comprising texels possessing randomly valued coefficients;
    (b) selecting a texel from said random PTM matrix;
    (c) determining a first neighborhood of said texel from said random PTM matrix;
    (d) comparing said first neighborhood to neighborhoods of a sample PTM texture to determine an optimal texel of said sample PTM texture using at least one u, v pair, wherein u and v define intensities of illumination in orthogonal directions in said plane; and
    (e) assigning PTM coefficients of said optimal texel to said texel from said random PTM matrix.

2. The method of claim 1 further comprising the step of:
    (f) repeating steps (a)–(e) for each texel of said random PTM matrix.

3. The method of claim 1 wherein said step of evaluating utilizes at least three u,v pairs.

4. The method of claim 1 wherein said step of comparing comprises the sub-steps of:
    evaluating each texel for said first neighborhood utilizing multiple u,v pairs; evaluating each texel for a second neighborhood utilizing said multiple u,v pairs, said second neighborhood being one of said neighborhoods of said sample PTM texture; and calculating a norm between values associated with said first neighborhood and values associated with said second neighborhood.

5. The method of claim 4 wherein said sub-step of calculating a norm includes summation over chromatic channels.

6. The method of claim 1 wherein said at least one u,v pair is selected such that $(u^2+v^2)^{1/2}$ approximately equals 0.9.

7. The method of claim 1 wherein said step of generating a random PTM matrix comprises the sub-steps of:
    randomly selecting a texel from said sample PTM texture; and
    assigning coefficients of said selected texel to a particular texel of said random PTM texture.

8. The method of claim 1 wherein said step of comparing comprises the sub-step of:
    searching a tree-structure vector quantization (TSVQ) tree.

9. The method of claim 1 further comprising the step of:
    constructing a multi-resolution data structure from said random PTM matrix.

10. A system for rendering a digital image, comprising:
    a first texture map data structure representing a texture map of a plurality of texels, said texture map data structure comprising a plurality of coefficients to define a respective lighting function for each texel;
    a second texture map data structure representing a texture map of a plurality of texels, said second texture map data structure comprising a plurality of randomly valued coefficients to define a respective lighting function for each texel; and
    a transformation algorithm for replacing said randomly valued coefficients of said second texture map data structure using said first texture map data structure, said transformation algorithm being operable to compare a neighborhood of each respective texel in said second texture map data structure to neighborhoods in said first texture map data structure, wherein said comparison comprises evaluating respective lighting equations for texels in said neighborhoods using multiple pairs of scalar parameters.

11. The system of claim 10 wherein said multiple pairs of scalar parameters represent scalar parameters associated with orthogonal vectors in a plane.

12. The system of claim 11 wherein said orthogonal vectors are a projection of a vector representing illumination of texture maps defined by said first and second texture map data structures.

13. The system of claim 10 wherein said second texture map data structure and said transformation algorithm are implemented within a video processing card.

14. The system of claim 10 further comprising:
    a function for assigning random values to coefficients of said second texture map data structure before said transformation algorithm is operable.

15. The system of claim 14 wherein, for each texel in said second texture map data structure, said function generates a random number according to a uniform probability distribution to index a texel in said first texture map data structure and assigns the respective coefficients of said indexed texel to a respective texel in said second texture map data structure.

16. A method for synthesizing a texture for use in rendering a graphical image, comprising:
    generating a first texture map data structure of a plurality of texels, wherein each texel comprises a plurality of coefficients of a multivariable equation that defines a brightness level of the respective texel;
    assigning random values to each plurality of coefficients of said first texture map data structure; and
    replacing random values of each plurality of coefficients of said first texture map data structure by repetitively comparing a neighborhood of a respective texel in said first texture map data structure to neighborhoods of texels in a second texture map data structure.

17. The method of claim 16 wherein said replacing comprises:
    evaluating a neighborhood of a respective texel in said first texture map data structure using multiple groups of variables for respective multivariable equations; and
    evaluating neighborhoods of texels in said second texture map data structure using said multiple groups of variables for respective multivariable equations.

18. The method of claim 17 further comprising:

calculating norm metrics between said evaluation of said neighborhood of a respective texel in said first texture map and said evaluations of neighborhoods of texels in said second texture map data structure.

19. The method of claim 16 further comprising:

defining an illumination vector for texture maps associated with said first texture map data structure and said second texture map data structure;

projecting said illumination vector onto a plane to generate two scalar quantities; and using said two scalar quantities to evaluate respective multivariable equations during comparison of said neighborhoods.

20. The method of 16 wherein said multivariable equation is a biquadratic equation.

* * * * *